Nov. 14, 1961     E. D. HARMS     3,008,734
ARTICULATED VEHICLE ASSEMBLY AND HITCH FOR USE WITH SAME
Filed Aug. 7, 1959
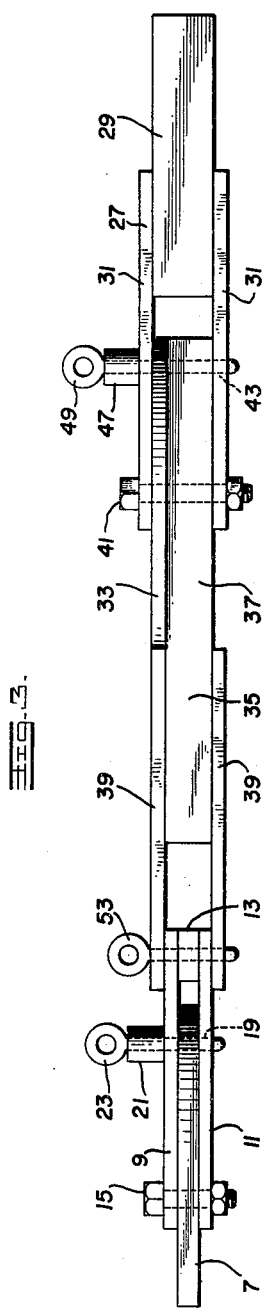
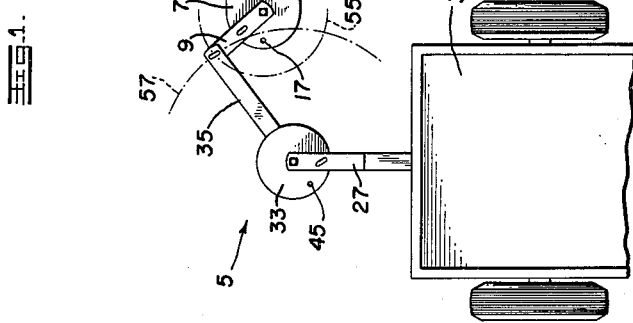
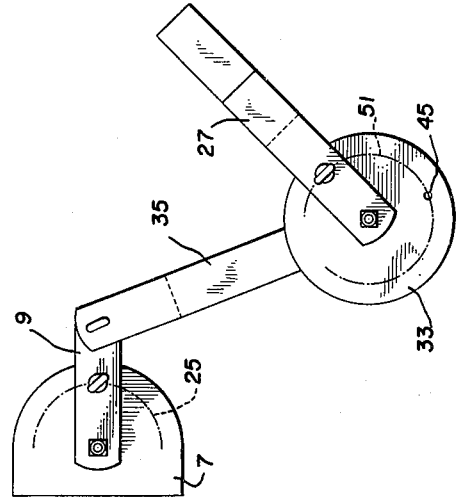
INVENTOR.
EVERT D. HARMS
BY
ATTORNEYS

3,008,734
ARTICULATED VEHICLE ASSEMBLY AND HITCH FOR USE WITH SAME

Evert D. Harms, Brule, Nebr.; Milan L. Harms, executor of said Evert D. Harms, deceased
Filed Aug. 7, 1959, Ser. No. 832,382
1 Claim. (Cl. 280—478)

The present invention relates to articulated vehicle assemblies and hitches for use in such assemblies, and more particularly to means for coupling and uncoupling a traction vehicle and a drawn vehicle. The invention has utility in the articulation of an assembly of a traction vehicle such as a tractor or truck or the like and a drawn vehicle such as a trailer, a wagon, a farm implement, or the like.

In the past, it has been proposed to couple together traction and drawn vehicles by providing a draw bar on the rear of the traction vehicle and a swingable tongue on the front of the drawn vehicle. One or both of the vehicles was maneuvered until the tongue on the drawn vehicle could be swung into such position relative to the draw bar of the traction vehicle that a hinge pin could be inserted through the tongue and draw bar or the tongue and draw bar could be otherwise interconnected for swinging movement relative to each other about a vertical axis.

The draw bar and the tongue each had a coupling point, such as the vertical holes through which a hinge pin extended; and when coupling the vehicles together, it was necessary to arrange the vehicles relative to each other in such a position that the coupling point on the draw bar lay precisely on the arc traced by the coupling point on the swingable tongue, so that upon swinging the tongue the coupling points on the tongue and draw bar could be made to coincide to permit coupling. Naturally, this entailed a great deal of maneuvering of one or both of the vehicles. When only one person was available for this job and the drawn vehicle was too heavy to push by hand, it was necessary to move the traction vehicle to a trial position, dismount, swing the tongue to see if the coupling points coincided, get back on the traction vehicle and try again, and repeat this procedure until the vehicles were accurately positioned relative to each other. When this procedure was attempted on uneven or rocky ground, the successful coupling of the vehicles was often a matter of sheer luck.

Accordingly, it is an object of the present invention to provide an articulated vehicle assembly and a hitch for use with the same, that may be coupled without precisely positioning the vehicles relative to each other.

It is a further object of the present invention to provide such an assembly and hitch including a tongue and draw bar which when fully coupled will nevertheless provide only a single point of articulation between the vehicles, in line with both the tongue and the draw bar, and with the tongue and the draw bar in lengthwise alignment with the vehicles on which they are respectively mounted, so that steering of the drawn vehicle by the traction vehicle is facilitated.

Finally, it is an object of the present invention to provide a hitch for use with an articulated vehicle assembly, which is relatively simple and inexpensive to manufacture, easy to install, operate, maintain and repair, and rugged and durable in use.

Other objects and advantages of the present invention will become apparent from a consideration of the following description, taken in connection with the accompanying drawing, in which:

FIGURE 1 is a fragmentary plan view of an articulated vehicle assembly embodying a hitch according to the present invention;

FIGURE 2 is an enlarged plan view of the hitch itself in a partly collapsed position; and FIGURE 3 is a still further enlarged elevational view of a hitch according to the present invention shown in its extended or fully coupled position.

Referring now to the drawing in greater detail, there is shown an articulated vehicle assembly comprising a traction vehicle such as a tractor 1 adapted to draw a drawn vehicle such as a wagon 3 by means of an interconnecting hitch shown generally at 5.

Hitch 5 includes a first base comprising a first flat horizontal plate 7 which is adapted to be secured to the rear of tractor 1 as by welding or bolting or the like and which has a semicircular trailing edge. A first bar or draw bar 9 is mounted at one end on plate 7 for swinging movement about a vertical axis perpendicular to plate 7. Draw bar 9 is comprised of a pair of straps 11 which are parallel to and overlie each other and are spaced apart at their outer or free ends by a spacer 13 therebetween, so that straps 11 in effect form the legs of a bifurcation. It will be noted, therefore, that the term "bar" as used in this application is not necessarily restricted to a solid rod, but includes elongated member which may be composite in structure. At their inner or pivotally mounted ends, straps 11 are secured on either side of plate 7 by means of a nut and bolt assembly 15 which passes through the inner ends of the straps and through plate 7 and defines a first vertical axis of horizontal swinging movement. If desired, the nuts may be secured to the bolt of assembly 15 by welding so as to avoid loss.

Plate 7 is provided with a first opening 17 therein which in the illustrated embodiment extends entirely through plate 7. Opening 17 is in line with the first axis provided by nut and bolt assembly 15 lengthwise of tractor 1. In other words, the axis of swinging movement of the draw bar, and first opening 17, lie on a line which as seen from above, is parallel to the longitudinal midline of tractor 1, and which preferably, as in the illustrated embodiment, coincides with the longitudinal midline of tractor 1.

Straps 11 are provided with second openings therethrough which are alignable with first opening 17 upon swinging of draw bar 9, and which, when aligned with opening 17, are also in lengthwise alignment with tractor 1. A hollow cylindrical sleeve 21 surrounds the opening 19 through the upper strap 11 and extends perpendicular to plate 7. A drop pin 23 is vertically slidably disposed in sleeve 21 and extends through sleeve 21 and the upper strap 11 is continuously urged toward plate 7 by gravity. Plate 7 has an upper surface which provides a track on both sides of opening 17 along which the lower end of pin 23 rides in slidable engagement during most of the swinging movement of draw bar 9, as indicated by the line 25 in FIGURE 2. However, pin 23 is adapted to enter opening 17 when openings 17 and 19 are aligned. From the shape of line 25, it will be seen that this track, which comprises a portion of the upper surface of plate 7, is circular about the first axis defined by nut and bolt assembly 15, as is also the trailing edge of plate 7.

At its other end, hitch 5 includes a second base comprising a second bar or base bar 27 adapted to be rigidly secured to the front of wagon 3 in longitudinal alignment therewith and preferably, as shown in FIGURE 1, in alignment with the longitudinal midline of wagon 3. Base bar 27 comprises an elongated rigid member 29 securable at one end to the drawn vehicle as by welding or bolting or the like, and which for example may itself be an inverted channel member or the like. Base bar 27 also inclueds a pair of flat horizontal parallel superposed straps 31 one secured on either side of member 29 as by welding or the like, the straps 31 forming the legs of a bifurcation, so that base bar 27, like draw bar 9, need not necessarily be and in the illustrated embodiment is not of single piece construction but is composite.

Mounted for rotation between the legs of the bifurcation of base bar 27 is a second plate 33 which in the illustrated embodiment is circular, plate 33 being horizontal and flat and mounted for rotation on and relative to base bar 27 about its vertical axis perpendicular to its plane. Plate 33 is also secured to a third bar or tongue 35 which is also a composite, of an elongated member 37 to which is secured a pair of straps 39 parallel to each other and superposed and secured on either side of member 37 as by welding or the like, these last straps also forming the legs of a bifurcation and may be an inverted channel member. Member 37 is secured to the under side of second plate 33 as by welding or the like. The swinging connection between base bar 27 on the one hand and second plate 33 and tongue 35 on the other hand is provided by a nut and bolt assembly 41, of which the nuts may be welded to the bolt to prevent loss, and which secures the parts in assembly but permits relative swinging movement therebetween.

Straps 31 of base bar 27 are provided with third openings 43 therethrough which are in line with the second axis described above lengthwise of wagon 3. Second plate 33 is provided with a fourth opening 45 therein, which in the illustrated embodiment extends through plate 33 and through member 37. Fourth opening 45 is in line with the second axis defined by nut and bolt assembly 41 and tongue 35 and is alignable with third openings 43 upon swinging movement of plate 33 and tongue 35. In this last position, tongue 35, nut and bolt assembly 41, openings 43 and 45 and base bar 27 are all in line with each other and in lengthwise alignment with wagon 3, and in the illustrated embodiment are in coincidence with the longitudinal midline of wagon 3.

A hollow cylindrical sleeve 47 is coaxial with third openings 43 and surrounds the opening 43 on the upper strap 31 and is secured to the upper surface of that strap. A drop pin 49 is vertically slidable in sleeve 47 and is continuously urged by gravity toward plate 33. Pin 49 is adapted to extend into and through third and fourth openings 43 and 45, and does so when openings 43 and 45 are aligned with each other. When openings 43 and 45 are not aligned with each other, pin 49 extends through opening 43 in the upper strap 31 and rides on the upper surface of plate 33 about a circular track on both sides of opening 45, the track being provided by the upper surface of plate 33 as indicated by line 51 in FIGURE 2.

The free ends of draw bar 9 and tongue 35 are provided with vertical openings therethrough such that when the free end of draw bar 9 is disposed between the legs of the bifurcation provided by the free end of tongue 35, the vertical holes through these free ends will be aligned for the reception of a removable hitch pin 53 held therein by gravity and about the vertical axis of which the tongue and draw bar have swinging movement relative to each other. Hitch pin 53, as well as drop pins 23 and 49, have enlarged heads so that they do not fall through their respective openings. The axes provided by nut and bolt assemblies 15 and 41 and hitch pin 43 are all vertical and parallel to each other. These axes, as well as the axes of drop pins 23 and 49, are all spaced substantial distances from each other.

In operation, tractor 1 and wagon 3 are positioned adjacent each other, for example in the position shown in FIGURE 1, but they need not be precisely positioned relative to each other. With drop pins 23 and 49 riding up and out of the holes in their respective plates 7 and 33 and sliding on the upper surfaces of those plates, draw bar 9 may be swung in an arc as indicated by line 55 in FIGURE 1 and tongue 35 may be swung in an arc of larger radius as indicated by line 57 in FIGURE 1. For practically any position of vehicles 1 and 3 adjacent each other, the arcs 55 and 57 will intersect at two points, either of which may be used as the coupling point. At one of these coupling points, hinge pin 53 is inserted through the free ends of the tongue and draw bar, and then tractor 1 is moved forward to cause drawbar 9 to swing relative to its associated plate 7 until drop pin 23 falls into opening 17. The drawbar is thus automatically releasably locked in fixed position relative to tractor 1 and in lengthwise alignment with tractor 1. Upon further movement of tractor 1, wagon 3 is swung around behind the tractor until base bar 27 and tongue 35 align with each other, whereupon drop pin 49 falls into opening 45, thereby automatically releasably locking tongue 35 in fixed position relative to and in longitudinal alignment with base bar 27 and wagon 3. This is the finally coupled position of parts shown in FIGURE 3. It will be noted that in this position, the tongue and draw bar are in longitudinal alignment with their respective vehicles and have only one point of articulation between them about a vertical axis passing through their free ends. As is well known, this is the form of articulation between draft and drawn vehicles which provides optimum steering characteristics of the drawn vehicle by manipulation of the draft vehicle. It will also be observed that the provision of an assembly of base bar 27 and tongue 35 of a length considerably greater than draw bar 9 also aids in steering the drawn vehicle from the traction vehicle, as the fulcrum point between the vehicles corresponding to the location of the hinge pin is substantially closer to, and of shorter lever arm relative to, the traction vehicle than relative to the drawn vehicle. Also, the provision of plate 33 mounted on forwardly projecting base bar 27 permits a wider range of swinging movement of tongue 35 than if plate 33 had the form of plate 7 and were securely fixed to the drawn vehicle in the manner that plate 7 is fixed to the traction vehicle. Thus, the base bar 27 affords the dual novel advantage not only of positioning plate 33 forwardly to give a wider range of swinging movement but also of increasing the effective length of the tongue when the parts are in fully coupled position thereby to improve the steering characteristics of the drawn vehicle.

From a consideration of the foregoing disclosure, it will be obvious that all of the initially recited objects of the present invention have been achieved.

Although the present invention has been described and illustrated in connection with a preferred embodiment, it is to be understood that modifications and variations may be resorted to without departing from the spirit of this invention, as those skilled in this art will readily understand. For example, the drop pins could be continuously urged toward their respective plates other than by gravity, for example by springs. These and other modifications and variations are considered to be within the purview and scope of the present invention as defined by the appended claim.

What is claimed is:

A hitch for use in an articulated vehicle assembly, comprising a first plate adapted to be fixedly secured to one of a pair of vehicles, a first bifurcated bar mounted on said first plate for swinging movement about a first axis perpendicular to said first plate and having one leg on each side of the first plate and a spacer element between the free ends of the legs, said first plate having a first opening therein spaced from said first axis, said first bar having a second opening through both legs thereof alignable with said first opening upon swinging of said first bar, a first pin disposed in said second opening and adapted to enter said first opening, said first plate having a surface providing a circular track on which an end of said first pin slides on both sides of said first opening, a second bifurcated bar adapted to be fixedly secured to the other of said pair of vehicles and terminating at its free end in a pair of spaced legs, a second plate and a third bar in unitary assembly with each other and mounted on said second bar between the legs of said second bar for swinging movement relative to said second bar about a second axis perpendicular to and passing through said second plate and the free ends of the legs of said second bar, said second bar having a third opening therethrough spaced from said second axis, said second plate and third bar having a fourth opening therethrough alignable with said third opening upon rotation of said second plate and third bar, a second pin disposed in said third opening and adapted to enter said fourth opening, said second plate having a surface providing a circular track on which an end of said second pin slides on both sides of said fourth opening, said third bar being bifurcated and terminating in a pair of spaced legs at its end remote from said second plate, said spacer element and the free ends of the legs of said first bar being disposed between the free ends of the legs of said third bar, and a third pin passing through and pivotally interconnecting said spacer element and the free ends of the legs of said first and third bars.

References Cited in the file of this patent

UNITED STATES PATENTS

| | | |
|---|---|---|
| 910,329 | Todd | Jan. 19, 1909 |
| 1,491,637 | Schrum | Apr. 22, 1924 |
| 2,665,144 | Birdwell | Jan. 5, 1954 |
| 2,898,127 | Plumb | Aug. 4, 1959 |
| 2,905,343 | Heising | Sept. 22, 1959 |

FOREIGN PATENTS

| | | |
|---|---|---|
| 488,970 | Germany | Jan. 11, 1930 |